(12) United States Patent
Shi et al.

(10) Patent No.: US 9,530,365 B2
(45) Date of Patent: Dec. 27, 2016

(54) METHOD FOR CONTROLLING SIGNAL VALUE ON GATE LINE, GATE DRIVING CIRCUIT AND DISPLAY DEVICE

(71) Applicant: BEIJING BOE OPTOELECTRONICS TECHNOLOGY CO., LTD., Beijing (CN)

(72) Inventors: Lingyun Shi, Beijing (CN); Yi Zheng, Beijing (CN); Rui Liu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 170 days.

(21) Appl. No.: 14/092,317

(22) Filed: Nov. 27, 2013

(65) Prior Publication Data
US 2014/0146025 A1 May 29, 2014

(30) Foreign Application Priority Data

Nov. 29, 2012 (CN) .......................... 2012 1 0500982

(51) Int. Cl.
*G09G 3/36* (2006.01)
*G02F 1/1362* (2006.01)
*G02F 1/1345* (2006.01)

(52) U.S. Cl.
CPC ....... *G09G 3/3648* (2013.01); *G02F 1/136286* (2013.01); *G09G 3/3677* (2013.01);
(Continued)

(58) Field of Classification Search
CPC ................ G09G 3/3648; G09G 3/3677; G09G 2300/0426; G09G 2310/0278; G09G 2320/0223; G09G 2300/0408; G02F 1/136286; G02F 1/1345
See application file for complete search history.

(56) References Cited

U.S. PATENT DOCUMENTS

2004/0041774 A1* 3/2004 Moon .................. G09G 3/3677
345/99
2005/0116914 A1 6/2005 Nagao et al.
(Continued)

FOREIGN PATENT DOCUMENTS

CN 1624747 A 6/2005
CN 101763837 A 6/2010

OTHER PUBLICATIONS

Extended European Search Report Issued Jul. 25, 2014; Appln. No. EP 13 19 4870.
(Continued)

Primary Examiner — Christopher E Leiby
(74) Attorney, Agent, or Firm — Ladas & Parry LLP

(57) ABSTRACT

The disclosure relates to a method for controlling signal values on gate lines, a gate driving circuit and a display device. The method comprises: for each of gate lines in the valid display area, in a first frame in any two adjacent frames of image, connecting a gate connecting line in a first layer to a gate line by a first strobe unit and applying a first signal value to the gate line; in a second frame, connecting a gate connecting line in a second layer to the gate line by a second strobe unit and applying a second signal value to the gate line. It may address the issue of H-line Mura due to different impedances of wires in the gate layer and the S/D layer.

6 Claims, 4 Drawing Sheets

(52) U.S. Cl.
CPC ... *G02F 1/1345* (2013.01); *G09G 2300/0408* (2013.01); *G09G 2300/0426* (2013.01); *G09G 2310/0278* (2013.01); *G09G 2320/0223* (2013.01)

(56) References Cited

U.S. PATENT DOCUMENTS

| | | | |
|---|---|---|---|
| 2006/0114216 A1* | 6/2006 | Shim | G09G 3/3677 345/100 |
| 2006/0203604 A1* | 9/2006 | Park | G09G 3/3648 365/185.23 |
| 2009/0267883 A1* | 10/2009 | Kim et al. | 345/94 |
| 2011/0304602 A1* | 12/2011 | Chen et al. | 345/211 |
| 2012/0050633 A1* | 3/2012 | Chen et al. | 349/42 |
| 2013/0044044 A1* | 2/2013 | Ha et al. | 345/55 |
| 2013/0162304 A1* | 6/2013 | Kim | 327/109 |

OTHER PUBLICATIONS

Second Chinese Office Action Dated Oct. 15, 2014; Appln. No. 201210500982.1.
First Chinese Office Action Issued Apr. 29, 2014 Appln. No. 201210500982.1.
EPO—Office Action dated Apr. 21, 2016; Appln. No. 13 194 870.5-1904.

* cited by examiner

METHOD FOR CONTROLLING SIGNAL VALUE ON GATE LINE, GATE DRIVING CIRCUIT AND DISPLAY DEVICE

TECHNICAL FIELD

The present disclosure relates to a field of display technology, and in particularly, to a method for controlling a signal value on a gate line, a gate driving circuit and a display device.

BACKGROUND

Since a TFT-LCD becomes smaller in size while a resolution of the TFT-LCD increases continuously, a problem that there is no sufficient space for laying out wires in a Fan-out area increasingly emerges. In order to solve the problem that there is no sufficient space for laying out the wires in the Fan-out area, the wires in the Fan-out area are generally laid out in two layers at present.

As illustrated in FIG. 1, gate lines led from two ends of an Integrated Circuit (IC) chip distribute symmetrically, i.e., which are numbered as 1, 3, 5, 7, 9 and 2, 4, 6 . . . , 8, 10, respectively, the gate lines led from each end of the chip are laid out alternatively in two layers of metal. The gate lines 1, 5, 9 . . . are located in a same layer of metal (S/D layer, a source layer), and the gate lines 3, 7, . . . are located in a same layer of metal (a gate Layer); the gate lines 2, 6, 10 . . . are located in a same layer of metal (the gate layer), and the gate lines 4, 8, . . . are located in a same layer of metal (the S/D layer); a gate line a in a valid display area is connected to a gate line 1 in the S/D layer of the Fan-out area, and a gate line b in the valid display area is connected to a gate line 2 in the gate layer of the Fan-out area. As the two layers of metal, i.e., the gate layer of metal and the S/D layer of metal are different in materials and thickness, an impedance of the wires in the gate layer and that in the S/D layer are different from each other, and thus a signal value at the gate line a is different from that at the gate line b in the valid display area, which results in variance in charging effects one of the gate lines in different rows in the valid display area, so that a H-line Mura (horizontal line Mura) occurs, and a the picture in which the H-line Mura occurs presents unevenness color and thus a quality of the picture is deteriorated when the picture is played back.

Today, there is not any one improved solution for eliminating the H-line Mura.

SUMMARY

Embodiments of the present disclosure provide a method for controlling signal values on gate lines and an apparatus thereof, a gate driving circuit and a display device to address an issue of a H-line Mura due to different impedances of wires in a gate layer and a S/D layer.

An embodiment of the present disclosure provides a method for controlling signal values on gate lines in a valid display area, wherein the method comprises:

for each of gate lines in the valid display area, in a first frame of any two adjacent frames of image, connecting a gate connecting line in a first layer to the gate line by a first strobe unit and applying a first signal value to the gate line via the gate connecting line in the first layer;

in a second frame in the two adjacent frames of image, connecting a gate connecting line in a second layer to the gate line by a second strobe unit and applying a second signal value to the gate line via the gate connecting line in the second layer;

wherein the gate connecting line in the first layer and the gate connecting line in the second layer are located in different layers of a Fan-out area on a display substrate, for connecting a signal source and the gate line.

An embodiment of the present disclosure provides an apparatus for controlling signal values on gate lines in a valid display area, wherein the apparatus comprises:

a first control module for, for each of gate lines in the valid display area, in a first frame in any two adjacent frames of image, connecting a gate connecting line in a first layer to the gate line by a first strobe unit and applying a first signal value to the gate line via the gate connecting line in the first layer;

a second control module for, for in a second frame in the two adjacent frames of image, connecting a gate connecting line in a second layer to the gate line by a second strobe unit and applying a second signal value to the gate line via the gate connecting line in the second layer;

wherein the gate connecting line in the first layer and the gate connecting line in the second layer are located in different layers of a Fan-out area on a display substrate for connecting a signal source and the gate line.

An embodiment of the present disclosure provides a gate driving circuit comprising an integrated circuit driving module and a driving control module;

wherein the driving control module comprises one or more first strobe units, one or more second strobe units, one or more gate connecting lines in a first layer, one or more gate connecting lines in a second layer, one or more first gate lines and one or more second gate lines; wherein the first strobe unit comprises a P-type Metal Oxide Semiconductor (PMOS) transistor and an N-type Metal Oxide Semiconductor (NMOS) transistor, a same signal is applied to gates of the PMOS transistor and the NMOS transistor, and the gate connecting line in the first layer is connected to a drain of the NMOS transistor and a source of the PMOS transistor of the first strobe unit, respectively; the second strobe unit comprises a PMOS transistor and an NMOS transistor, a same signal is applied to gates of the PMOS transistor and the NMOS transistor, the gate connecting line in the second layer is connected to a drain of the NMOS transistor and a source of the PMOS transistor of the second strobe unit, respectively; the first gate line is connected to the source of the NMOS transistor of the first strobe unit and the source of the NMOS transistor of the second strobe unit, respectively; and the second gate line is connected to the drain of the PMOS transistor of the first strobe unit and the drain of the PMOS transistor of the second strobe unit, respectively;

the integrated circuit driving module generates gate driving signals and transmits the gate driving signals to the driving control module;

the driving control module, for a first frame in any two adjacent frames of image, connects the gate connecting line in the first layer to the first gate line by applying a first control signal to the gates of the PMOS transistor and NMOS transistor of the first strobe unit, and applies a first signal value to the first gate line via a gate connecting line in the first layer; connects the gate connecting line in the second layer to the second gate line by applying a second control signal to the gates of the PMOS transistor and NMOS transistor of the second strobe unit, and applies a second signal value to the second gate line via a gate connecting line in the second layer; and for a second frame in the two adjacent frames of image, connects the gate connecting line in the first layer to the second gate line by applying the second control signal to the gates of the PMOS transistor and NMOS transistor of the first strobe unit, and applies the first signal value to the second gate line via the gate connecting line in the first layer; connects the gate connecting line in the second layer to the first gate line by applying the first control signal to the gates of the PMOS transistor and NMOS transistor of the second strobe unit, and applies the second signal value to the first gate line via the gate connecting line in the second layer;

wherein the gate connecting line in the first layer and the gate connecting line in the second layer are located in different layers of a Fan-out area on a display substrate, for connecting a gate driving signal and the gate line; the first gate line and the second gate line are two adjacent gate lines in each group of gate lines disposed in the valid display area.

An embodiment of the present disclosure provides a display apparatus comprising the gate driving circuit as above.

In the embodiments of the disclosure, for each of the gate lines in the valid display area, in a first frame of any two adjacent frames of image, the gate connecting line in the first layer is connected to the gate line by the first strobe unit and the first signal value is applied to the gate line via the gate connecting line in the first layer; in a second frame of the two adjacent frames of image, the gate connecting line in the second layer is connected to the gate line by the second strobe unit and the second signal value is applied to the gate line via the gate connecting line in the second layer; wherein the gate connecting line in the first layer and the gate connecting line in the second layer are located in different layers of the Fan-out area on the display substrate, for connecting the signal source and the gate line. Since in one frame of two adjacent frames of image, the first signal value is applied to each of the gate lines in the valid display area, and in the other frame of the two adjacent frames of image, the second signal value is applied to each of the gate lines in the valid display area, charging effects for each of the gate lines in the valid display area can be complemented in the two adjacent frames of image, so that the issue of the H-line Mura due to the different impedances of the wires in the gate layer and the S/D layer can be addressed.

DETAILED DESCRIPTION OF EMBODIMENTS

To make the object, technical solution and advantageous of the present disclosure more clear, hereinafter, a detailed description will be further made to the embodiments of the present disclosure in connection with the accompanying drawings.

In an embodiment of the disclosure, for each of gate lines in the valid display area, in a first frame of any two adjacent frames of image, a gate connecting line in a first layer is connected to the gate line by a first strobe unit and a first signal value is applied to the gate line via the gate connecting line in the first layer; in a second frame, a gate connecting line in a second layer is connected to the gate line by a second strobe unit and a second signal value is applied to the gate line via the gate connecting line in the second layer; wherein the gate connecting line in the first layer and the gate connecting line in the second layer are located in different layers of the Fan-out area on the display substrate, for connecting a signal source and the gate line.

In any two adjacent frames of image, signals received in a first frame of image and a second frame of image at the gate line are transferred via the gate connecting lines in different layers, respectively, and thus in an entire display procedure (a sequence of pictures comprising a plurality of frames), the issue of the H-line unevenness due to different impedances of the connecting lines which are located in different layers of metal (the gate layer and S/D layer) may be alleviated by adopting a manner of compensation between frames.

In an embodiment of the present disclosure, the signal value, for example a first signal value and/or a second signal value may be a voltage signal value or a current signal value.

As implemented, the larger the signal value applied to a row of gate line in the valid display area in an image is, correspondingly the brighter a display of the row of gate line in the valid display area in the image is.

Hereinafter, detailed descriptions are given to the embodiments of the present disclosure with reference to the accompanying drawings.

Figure 2:
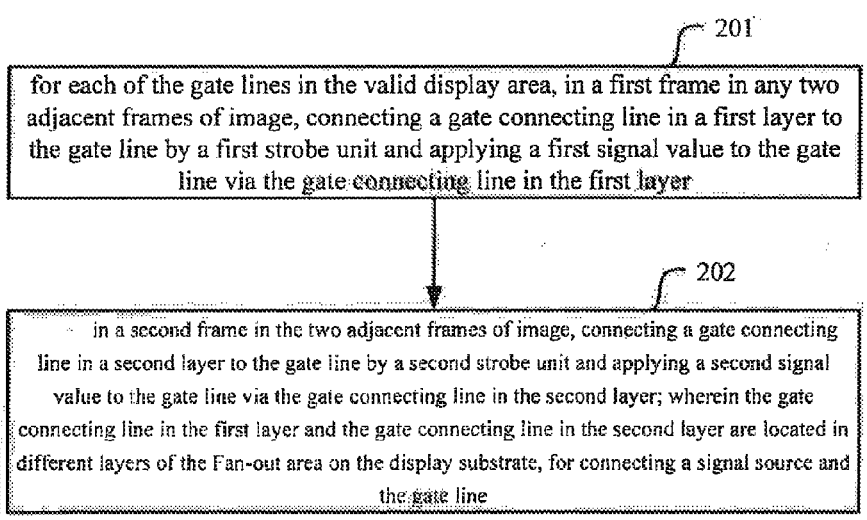
FIG. 2 is a schematic diagram illustrating a flow of a method for controlling signal values on gate lines in a valid display area according to an embodiment of the present disclosure.

As shown in FIG. 2, a method for controlling signal values on gate lines in a valid display area provided in an embodiment of the present disclosure comprises steps of:

Step 201, for each of the gate lines in the valid display area, in a first frame in any two adjacent frames of image, connecting a gate connecting line in a first layer to the gate line by a first strobe unit and applying a first signal value to the gate line via the gate connecting line in the first layer;

step 202, in a second frame in the two adjacent frames of image, connecting a gate connecting line in a second layer to the gate line by a second strobe unit and applying a second signal value to the gate line via the gate connecting line in the second layer;

wherein the gate connecting line in the first layer and the gate connecting line in the second layer are located in different layers of the Fan-out area on the display substrate, for connecting a signal source and the gate line.

Optionally, for each of gate connecting lines in the Fan-out area, the signal sources connecting to respective gate connecting lines may apply initial signals with a same initial value to the corresponding gate connecting lines, and may also apply initial signals with different initial values to of the corresponding gate connecting lines, respectively. Description will be given to in details as follows.

Mode 1: the signal sources connecting to the respective gate connecting lines apply the initial signals with a same initial value to the corresponding the gate connecting lines.

In this case, can apply the initial signals with a same initial value may be applied to the corresponding gate connecting lines by one signal source, when the initial signals with the same initial value may have a first signal value when they arrive at the gate lines in the valid display area via the gate connecting lines in the first layer, and the initial signals with the same initial value may have a second signal value when they arrive at the gate lines in the valid display area via the gate connecting lines in the second layer.

Mode 2: the signal sources connecting to the respective gate connecting lines apply initial signals with different initial values to the corresponding gate connecting lines respectively.

In this case, the signal sources connecting to the respective gate connecting lines may apply initial signals with the different initial values to the corresponding gate connecting lines according to the impedance of the respective gate connecting lines.

In an example, the larger the impedance of the gate connecting line is, the greater the applied initial value of the initial signal is, so that the initial signals may have a same signal value when they arrive at the gate lines in the valid display area via the gate connecting line in the first layer and the gate connecting line in the second layer, respectively, and thus the issue of the H-line Mura due to the different impedance of the wires in the gate layer and the S/D layer may be solved.

In an example, in the step 201, the connecting the gate connecting line in the First layer to the gate line by the first strobe unit and applying the first signal value to the gate line via the gate connecting line in the first layer comprises:

controlling the first strobe unit by a first control signal to connect the gate connecting line in the first layer to the gate line; and controlling the second strobe unit by a second control signal to disconnect the gate connecting line in the second layer from the gate line.

In an example, the first strobe unit may be any switch of which one end is connected with the gate connecting line in the first layer and the other end is connected with the gate line, such as an electronic switch, a diode, a transistor, a SCR (thyristor), a Metal Oxide Semiconductor (MOS), etc; and the second strobe unit may be any switch of which one end is connected with the gate connecting line in the second layer and the other end is connected with the gate line, such as an electronic switch, a diode, a transistor, a SCR (thyristor), a Metal Oxide Semiconductor (MOS) transistor, etc.

In an example, the first strobe unit and the second strobe unit may comprise one or more the switches, respectively.

In an example, the gate connecting line in the first layer may be a gate connecting line in the S/D layer, and may also be a gate connecting line in the gate layer; when the gate connecting line in the first layer is the gate connecting line in the S/D layer, the gate connecting line in the second layer is the gate connecting line in the gate layer; when the gate connecting line in the first layer is the gate connecting line in the gate layer, the gate connecting line in the second layer is the gate connecting line in the S/D layer.

In an example, the first control signal and the second control signal may be clock pulse signals whose high-low levels are compensated, and the high-low level of each of the clock pulse signals is converted between two adjacent frames of image. The first control signal and the second control signal may be the same, or may be different from each other. That is to say, the first control signal and the second control signal may be a same control signal, may originate from a same control signal or from different control signals.

Hereinafter, the embodiments of the present disclosure will be described by taking a case in which the first control signal and the second control signal are the same control signal and the strobe unites comprise one MOS transistor as an example, but implementations in other cases are similar to the embodiment of the present disclosure, and the details are omitted herein.

Figure 3:
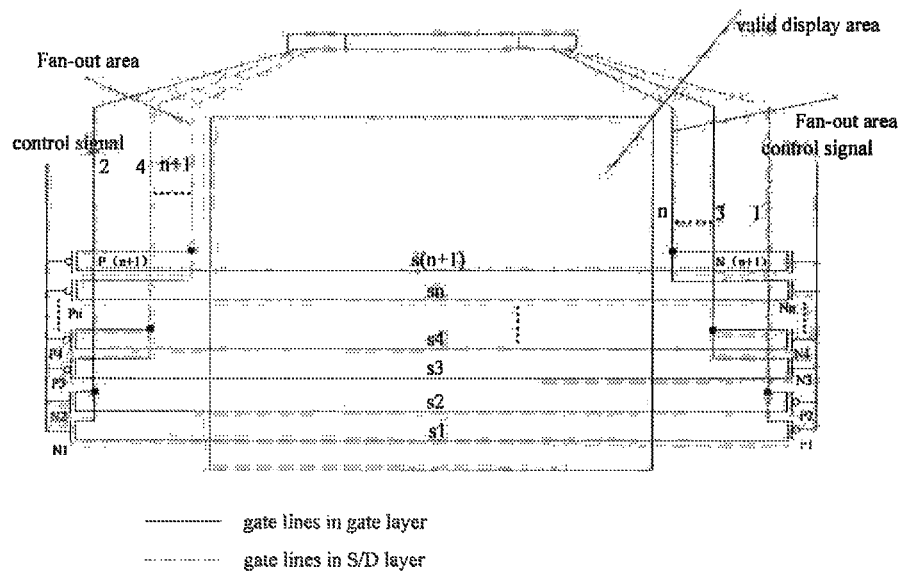
FIG. 3 is a schematic diagram illustrating a structure for controlling the signal values on the gate lines in the valid display area according to an embodiment of the present disclosure.

As shown in FIG. 3, gate lines s1, s2, s3, s4 . . . , sn and s(n+1) are gate lines located in the valid display area; gate connecting lines 1, 2, 3, 4, . . . , n and (n+1) are gate connecting lines located in the Fan-out area, wherein the gate connecting lines 1, 4, . . . , and (n+1) are gate connecting lines located in the S/D layer, and the gate connecting lines 2, 3, . . . , and n are gate connecting lines located in the gate layer; the first control signal and the second control signal are the same control signal.

If the gate connecting lines in the gate layer are the gate connecting lines in the first layer, and the connecting lines in the S/D layer are the gate connecting lines in the second layer (the case in which the gate connecting lines in the gate layer are the gate connecting lines in the second layer, and the connecting lines in the S/D layer are the gate connecting lines in the first layer is similar to the present embodiment), then respective NMOS transistors, i.e., N1, N2, N3, N4, . . . , Nn and N(n+1) are first strobe unites, and respective PMOS transistors, i.e., P1, P2, P3, P4, . . . , Pn and P(n+1) are second strobe unites.

When the control signal is at a high level, the first strobe unit N1 is turned on, and the gate connecting line in the first layer (the gate connecting line 2) is connected to s1; the second strobe unit P1 is turned off, and the gate connecting line in the second layer (the gate connecting line 1) is disconnected from s1, so that a first signal value is applied to s1.

Implementations for s2, s3, s4, . . . , sn, and s(n+1) are similar to the implementation for s1 as described above, and details are omitted herein.

Only types of the strobe unites or structure of the circuit is needed to be changed for a case in which the first control signal and the second control signal are different control signals.

In an example, in the step 202, the connecting the gate connecting line in the second layer to the gate line by the second strobe unit and applying the second signal value to the gate line via the gate connecting line in the second layer comprises:

controlling the first strobe unit by the first control signal to disconnect the gate connecting line in the first layer from the gate line; and controlling the second strobe unit by the second control signal to connect the gate connecting line in the second layer to the gate line.

In an example, an implementation for connecting the gate connecting line in the second layer to the gate line by the second strobe unit and applying the second signal value to the gate line via the gate connecting line in the second layer in the step 202 is similar to that for connecting the gate connecting line in the first layer to the gate line by the first strobe unit and applying the first signal value to the gate line via the gate connecting line in the first layer in the step 201.

Taking the case illustrated in FIG. 3 as an example, as shown in FIG. 3, when the control signal is at a low level, the first strobe unit N1 is turned off, and the gate connecting line in the first layer (the gate connecting line 2) is disconnected from s1; the second strobe unit P1 is turned on, and the gate connecting line in the second layer (the gate connecting line 1) is connected to s1, so that a second signal value is applied to s1.

Implementations for s2, s3, s4, . . . , sn, and s(n+1) are similar to that for s1, and the details are omitted herein.

As implemented, for each of gate lines in the valid display area, in the first frame in any two adjacent frames of image, the first signal value is applied to the gate line, and in the second frame in the two adjacent frames of image, the second signal value is applied to the gate line, so that the display effects of the two adjacent frames of image may be complemented.

In an example, the gate lines in the valid display area may be divided into a plurality of gate line groups each comprising one or more adjacent gate lines.

In an example, in one frame of image, the signal values applied to the gate lines in a same group are transmitted by the gate connecting lines in a same layer, and the signal values applied to the gate lines in two adjacent groups are transmitted by the gate connecting lines in different layers.

Figure 4:
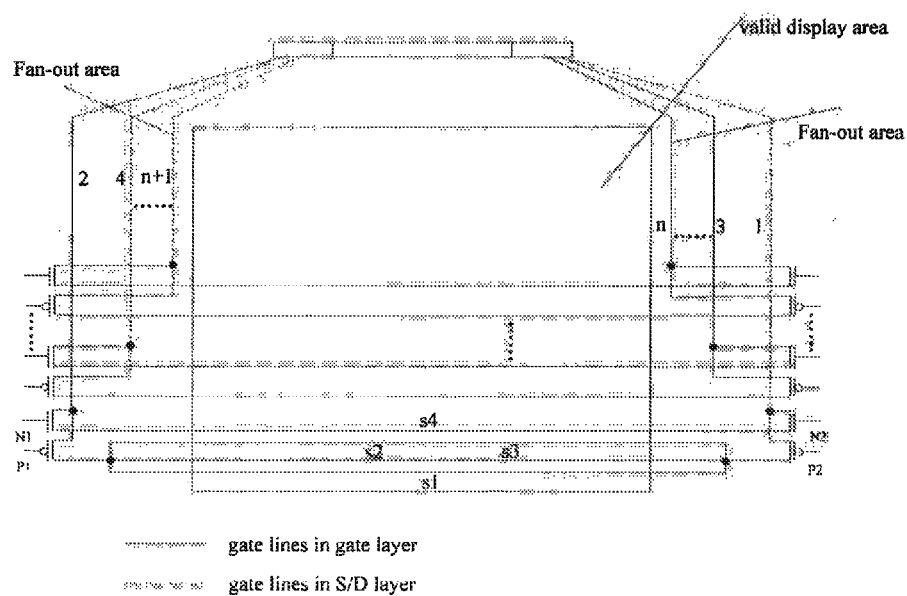
FIG. 4 is a schematic diagram illustrating a structure in which the gate lines in the valid display area are grouped according to an embodiment of the present disclosure.

As shown in FIG. 4, a gate line group between the strobe unit P1 and the strobe unit P2 comprises three adjacent gate lines s1, s2 and s3, and a gate line group between the strobe unit N1 and the strobe unit N2 comprises one gate line s4.

By applying a same first control signal to N1 and P1 and applying a same second control signal to N2 and P2 wherein the first control signal is different from the second control signal, it may be achieved that the signal values applied to the gate lines s1, s2 and s3 are transmitted by the gate connecting lines in the same layer while the signal values applied to the gate lines of two adjacent groups are transmitted by the gate connecting lines in the different layers.

Based on the same inventive concept, an embodiment of the present disclosure further provides an apparatus for controlling the signal values on the gate lines in the valid display area. Since the inventive principle of the apparatus is similar to that of the method provided in the embodiment of the present disclosure, an implementation of the apparatus may refer to that of the method, and the details are omitted herein.

Figure 5:
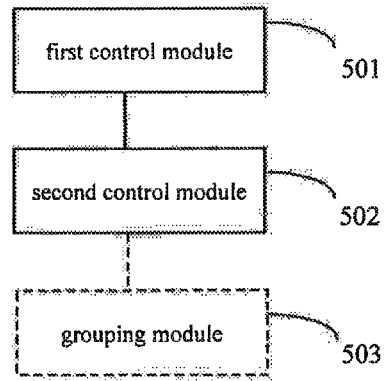
FIG. 5 is a schematic diagram illustrating a structure of an apparatus for controlling the signal values on the gate lines in the valid display area according to an embodiment of the present disclosure.

FIG. 5 is a schematic diagram showing a structure of the apparatus for controlling the signal values on the gate lines in the valid display area according to an embodiment of the present disclosure. As illustrated in FIG. 5, the apparatus for controlling the signal values on the gate lines in the valid display area comprises:

a first control module 501 for, for each of the gate lines in the valid display area, in a first frame in any two adjacent frames of image, connecting a gate connecting line in a first layer to a gate line via a first strobe unit and applying a first signal value to the gate line via the gate connecting line in the first layer;

a second control module 502 for, in a second frame in the two adjacent frames of image, connecting a gate connecting line in a second layer to the gate line via a second strobe unit and applying a second signal value to the gate line via the gate connecting line in the second layer;

wherein the gate connecting line in the first layer and the gate connecting line in the second layer are located different layers of a Fan-out area on the display substrate, for connecting a signal source and the gate line.

In an example, particularly, the first control module 501 controls the first strobe unit by a first control signal to connect the gate connecting line in the first layer to the gate line and controls the second strobe unit by a second control signal to disconnect the gate connecting line in the second layer from the gate line.

In an example, particularly, the second control module 502 controls the first strobe unit by the first control signal to disconnect the gate connecting line in the first layer from the gate line and controls the second strobe unit by the second control signal to connect the gate connecting line in the second layer to the gate line.

In an example, the first control signal and the second control signal may be clock pulse signals whose high-low levels are compensated, and the high-low level of each of the clock pulse signals is converted between two adjacent frames of image.

In an example, before the first control module 501 and/or the second control module 502 apply the first signal value or the second signal value to the gate line via the gate connecting line in the first layer or the gate connecting line in the second layer, for the respective gate connecting lines, initial signals with a same initial value are applied to the respective gate connecting lines by signal sources to which the corresponding gate connecting lines are connected; alternatively, initial signals with different initial values are applied to the respective gate connecting lines by the signal sources to which the corresponding gate connecting lines are connected based on the impedances of the respective gate connecting lines.

In an example, the apparatus further comprises a grouping module 503, for dividing the gate lines in the valid display area into a plurality of gate line groups each comprising one or more adjacent gate lines, wherein in one frame of image, the signal values applied to the gate lines in a same group are transmitted via the gate connecting lines in a same layer, and the signal values applied to the gate lines in two adjacent groups are transmitted via the gate connecting lines in different layers.

Figure 6:
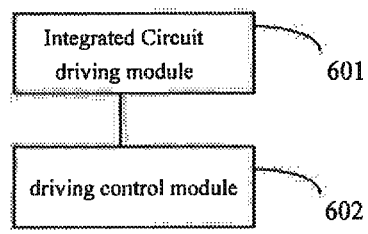
FIG. 6 is a schematic diagram illustrating a structure of a gate driving circuit provided in an embodiment of the present disclosure.

FIG. 6 is a schematic diagram illustrating a structure of a gate driving circuit provided in an embodiment of the present disclosure, as shown in FIG. 6, the gate driving circuit provided in the embodiment of the present disclosure comprises an integrated circuit driving module 601 and a driving control module 602.

The integrated circuit driving module 601 generates gate driving signals and transmits the gate driving signals to the driving control module 602.

For a first frame in any two adjacent frames of image, the driving control module 602 connects a gate connecting line in a first layer to a first gate line via a first strobe unit and applies a first signal value to the first gate line via the gate connecting line in the first layer, connects a gate connecting line in a second layer to a second gate line via a second strobe unit and applies a second signal value to the second gate line via the gate connecting line in the second layer; and for a second frame in the two adjacent frames of image, the driving control module 602 connects the gate connecting line in the first layer to the second gate line via the first strobe unit and applies the first signal value to the second gate line via the gate connecting line in the first layer, connects the gate connecting line in the second layer to the first gate line via the second strobe unit and applies the second signal value to the first gate line via the gate connecting line in the second layer.

Wherein the gate connecting line in the first layer and the gate connecting line in the second layer are located in different layers of the Fan-out area on the display substrate, for connecting a gate driving signal and the gate line; the first gate line and the second gate line are two adjacent gate lines in each gate line group located in the valid display area.

It should be noted that any manners in which the gate lines are grouped may be suitable to the embodiments of the present disclosure as long as the manner meets the grouping condition as follows: each gate line group comprises a first gate line and a second gate line which are two adjacent gate lines, and in a same frame of image, the gate connecting line in the Fan-out area to which the first gate line is connected and the gate connecting line in the Fan-out area to which the second gate line is connected are located in different layers.

In an example, the driving control module 602 comprises one or more first strobe units, one or more second strobe units, one or more gate connecting lines in a first layer, one or more gate connecting lines in a second layer, one or more first gate lines and one or more second gate lines; wherein a first strobe unit comprises a P-type Metal Oxide Semiconductor (PMOS) transistor and an N-type Metal Oxide Semiconductor (NMOS) transistor, a same signal is applied to the gates of the PMOS transistor and the NMOS transistor, and a gate connecting line in the first layer is connected to a drain of the NMOS transistor and a source of the PMOS transistor in the first strobe unit; a second strobe unit comprises a PMOS transistor and a NMOS transistor, wherein a same signal is applied to the gates of the PMOS transistor and the NMOS transistor, a gate connecting line in the second layer is connected to a drain of the NMOS transistor and a source of the PMOS transistor in the second strobe unit.

In an example, a control signal applied to the first strobe unit and a control signal applied to the second strobe unit may be same or be different; and the first strobe unit and the second strobe unit may be implemented by different circuit structures, respectively, for a case in which different control signals are applied to the first strobe unit and the second strobe unit, respectively and a case in which a same control signal is applied to the first strobe unit and the second strobe unit. In this regard, the description will be given to the two cases as follows.

Case 1: different control signals are applied to the first strobe unit and to the second strobe unit, respectively.

The first gate line of the driving control module 602 is connected to the source of the NMOS transistor in the first strobe unit and the source of the NMOS transistor in the second strobe unit, respectively, and the second gate line of the driving control module 602 is connected to the drain of the PMOS transistor in the first strobe unit and the drain of the PMOS transistor in the second strobe unit, respectively.

For a first frame in any two adjacent frames of image, the driving control module 602 connects a gate connecting line in the first layer to the first gate line by applying a first control signal to the gates of the PMOS transistor and NMOS transistor in the first strobe unit, and connects a gate connecting line in the second layer to the second gate line by applying a second control signal to the gates of the PMOS transistor and NMOS transistor in the second strobe unit; and for a second frame in the two adjacent frames of image, the driving control module 602 connects the gate connecting line in the first layer to the second gate line by applying the second control signal to the gates of the PMOS transistor and NMOS transistor in the first strobe unit, and connects the gate connecting line in the second layer to the first gate line by applying the first control signal to the gates of the PMOS transistor and NMOS transistor in the second strobe unit.

Figure 7:
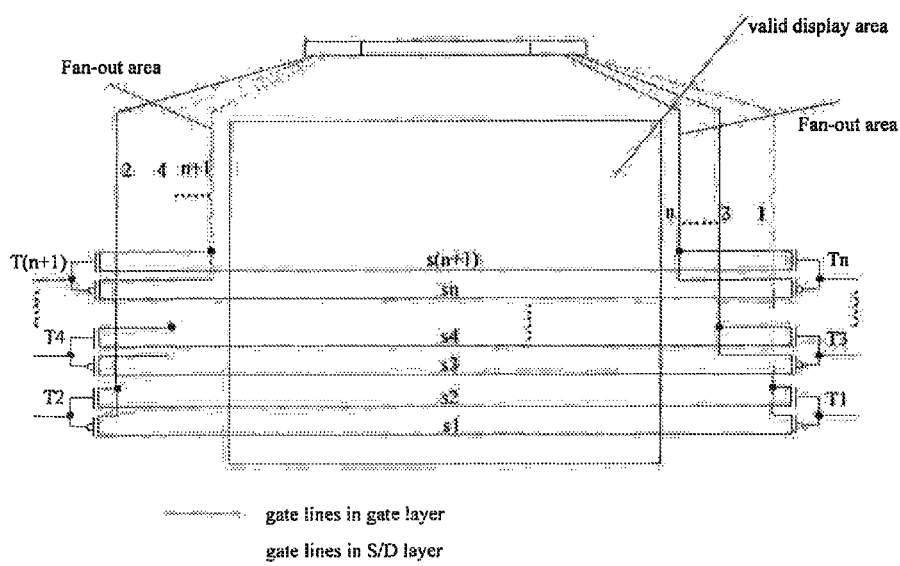
FIG. 7 is a schematic diagram illustrating a structure of the gate driving circuit when a first control signal is different from a second control signal according to an embodiment of the present disclosure.

As shown in FIG. 7, the gate lines s1, s2, s3, s4 ..., sn and s(n+1) are gate lines located in the valid display area; the gate connecting lines 1, 2, 3, 4, ..., n and (n+1) are gate connecting lines located in the Fan-out area, wherein the gate connecting lines 1, and (n+1) are gate connecting lines located in the S/D layer, and the gate connecting lines 2, 3, ..., and n are gate connecting lines located in the gate layer; T1, T2, T3, T4, Tn and T(n+1) represent the strobe units; it is assumed that s1 and s2 are determined as in a first gate line group, wherein s1 is a first gate line in the first gate line group, and s2 is a second gate line in the first gate line group; and it is assumed that s3 and s4 are determined as in a second gate line group, wherein s3 is a first gate line in the second gate line group, and s4 is a second gate line in the second gate line group; the signal value on the gate connecting line in the first layer is equal to the first signal value, and the signal value on the gate connecting line in the second layer is equal to the second signal value.

Descriptions will be given by taking an implementation in which the first control signal is applied to the first strobes T1 and T4 and the second control signal is applied to the second strobes T2 and T4 as an example. Other implementations are similar, and details are omitted herein.

For the first frame in the two adjacent frames of image, the first control signal is set as at a low level and the second control signal is set as at a high level, then the NMOS transistors in T1 and T4 are turned off and the PMOS transistors in T1 and T4 are turned on; NMOS transistors in T2 and T3 are turned on and the PMOS transistors in T2 and T3 are turned off; the PMOS transistor in T1 connects the gate connecting line 1 (the gate connecting line in the first layer) located in the S/D layer within the Fan-out area to s1 in the first gate line group (the first gate line); the NMOS transistor in T2 connects the gate connecting line 2 (the gate connecting line in the second layer) located in the gate layer within the Fan-out area to s2 in the first gate line group (the second gate line); the NMOS transistor in T3 connects the gate connecting line 3 (the gate connecting line in the second layer) located in the gate layer within the Fan-out area to s4 in the second gate line group (the second gate line); and the PMOS transistor in T4 connects the gate connecting line 4 (the gate connecting line in the first layer) located in the S/D layer within the Fan-out area to s3 in the second gate line group (the first gate line).

For the second frame in the two adjacent frames of image, the first control signal is set as at a high level and the second control signal is set as at a low level, then the NMOS transistors in T1 and T4 are turned on and the PMOS transistors in T1 and T4 are turned off; PMOS transistors in T2 and T3 are turned on and the NMOS transistors in T2 and T3 are turned off; the NMOS transistor in T1 connects the gate connecting line 1 (the gate connecting line in the first layer) located in the S/D layer within the Fan-out area to s2 in the first gate line group (the second gate line); the PMOS transistor in T2 connects the gate connecting line 2 (the gate connecting line in the second layer) located in the gate layer within the Fan-out area to s1 in the first gate line group (the first gate line); the PMOS transistor in T3 connects the gate connecting line 3 (the gate connecting line in the second layer) located in the gate layer within the Fan-out area to s3 in the second gate line group (the first gate line); and the NMOS transistor in T4 connects the gate connecting line 4 (the gate connecting line in the first layer) located in the S/D layer within the Fan-out area to s4 in the second gate line group (the second gate line).

For one frame in the two adjacent frames of image, the first control signal may be at the high level or be at the low level, and for the other frame in the two adjacent frames of image, the first control signal may be at the high level or be at the low level, as long as the signal value of the first control signal may turn on the PMOS transistor and the NMOS transistor in the control unit once respectively in the two adjacent frames of image.

Case 2: a same control signal is applied to the first strobe unit and the second strobe unit.

The first gate line of the driving control module 602 is connected to the source of the NMOS transistor in the first strobe unit and the drain of the PMOS transistor in the second strobe unit, and the second gate line of the driving control module 602 is connected to the drain of the PMOS transistor in the first strobe unit and the source of the NMOS transistor in the second strobe unit.

For a first frame in any two adjacent frames of image, the driving control module 602 connects the gate connecting line in the first layer to the first gate line by applying the first control signal to the gates of the PMOS transistor and NMOS transistor in the first strobe unit, and connects the gate connecting line in the second layer to the second gate line by applying the first control signal to the gates of the PMOS transistor and NMOS transistor in the second strobe unit; and for a second frame in the two adjacent frames of image, the driving control module 602 connects the gate connecting line in the first layer to the second gate line by applying the second control signal to the gates of the PMOS transistor and NMOS transistor in the first strobe unit; and connects the gate connecting line in the second layer to the first gate line by applying the second control signal to the gates of the PMOS transistor and NMOS transistor in the second strobe unit.

Figure 8:
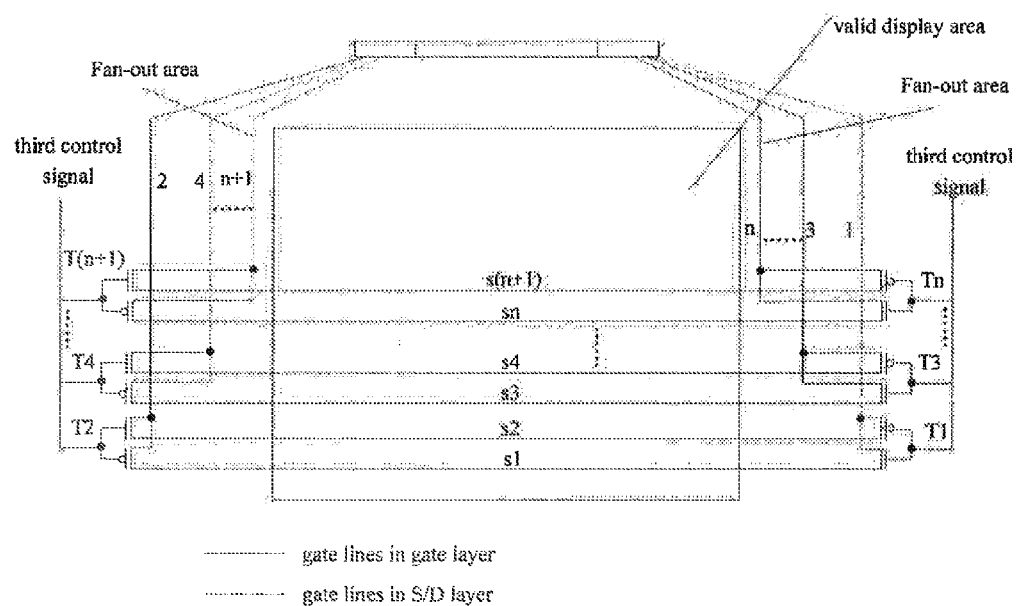
FIG. 8 is a schematic diagram illustrating the structure of the gate driving circuit when the first control signal is the same as the second control signal according to an embodiment of the present disclosure.

As shown in FIG. 8, the gate lines s1, s2, s3, s4, . . . , sn and s(n+1) are gate lines located in the valid display area; the gate connecting lines 1, 2, 3, 4, . . . , n and (n+1) are gate connecting lines located in the Fan-out area, wherein the gate connecting lines 1, 4, . . . , and (n+1) are gate connecting lines located in the S/D layer, and the gate connecting lines 2, 3, . . . , and n are gate connecting lines located in the gate layer; T1, T2. T3, T4, Tn and T(n+1) represent the strobe units; it is assumed that s1 and s2 are determined as in a first gate line group, wherein s1 is a first gate line in the first gate line group, and s2 is a second gate line in the first gate line group; T1 represents a first strobe unit and T2 represents a second strobe unit.

For the first frame in the two adjacent frames of image, a third control signal is set as at a high level, then the NMOS transistors in T1 and T2 are turned on and the PMOS transistors in T1 and T2 are turned off, the NMOS transistor in T1 connects the gate connecting line 1 (the gate connecting line in the first layer) located in the S/D layer within the Fan-out area to s1 in the first gate line group (the first gate line); the NMOS transistor in T2 connects the gate connecting line 2 (the gate connecting line in the second layer) located in the gate layer within the Fan-out area to s2 in the first gate line group (the second gate line).

For the second frame in the two adjacent frames of image, the third control signal is set as at a low level, then the PMOS transistors in T1 and T2 are turned on and the NMOS transistors in T1 and T2 are turned off; the PMOS transistor in T1 connects the gate connecting line 1 (the gate connecting line in the first layer) located in the S/D layer within the Fan-out area to s2 in the first gate line group (the second gate line); the PMOS transistor in T2 connects the gate connecting line 2 (the gate connecting line in the second layer) located in the gate layer within the Fan-out area to s1 in the first gate line group (the first gate line).

In an implementation, the first signal values applied to the first gate lines in the respective gate line groups by the driving control module 602 may be equal in part or may be unequal to each other, and the second signal values applied to the second gate lines in the respective gate line groups by the driving control module 602 may be equal in part or may be unequal to each other.

In an ideal state, the first signal values applied to the first gate lines in the respective gate line groups are equal to each other and the second signal values applied to the second gate lines in the respective gate line groups are also equal to each other. However, actually, the first signal values applied to the first gate lines in the respective gate line groups are equal in part or unequal to each other and the second signal values applied to the second gate lines in the respective gate line groups are equal in part or unequal to each other due to an influence of the manner in which the gate lines are laid out in the same layer on the Fan-out area, the manufacturing process and the like as implemented.

In practice, for one frame in two adjacent frames of image, in the case that the first signal values applied to the first gate lines in the respective gate line groups are not equal to each other, differences among the first signal values applied to the first gate lines in the respective gate line groups are relatively small, so there is no signification influence on the result of display; and in the case that the second signal values applied to the second gate lines in respective gate line groups are not equal to each other, differences among the second signal values applied to the second gate lines in respective gate line groups are relatively small, so there is no signification influence on the result of display.

Figure 1:
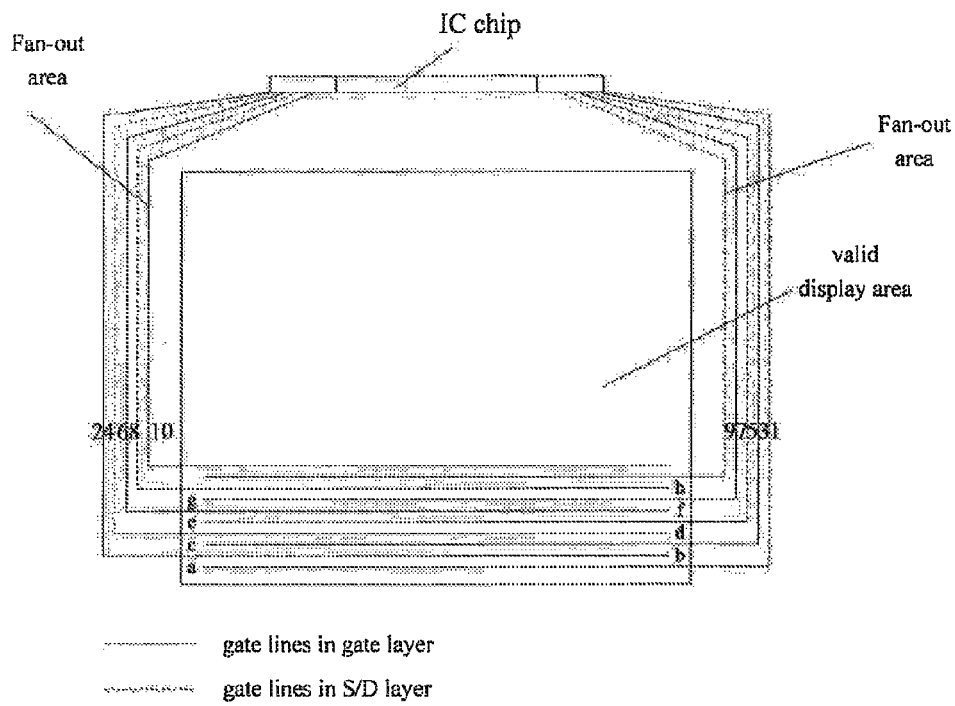
FIG. 1 is a schematic diagram illustrating that gate connecting lines in the Fan-out area are laid out alternatively in two layers of metal in the background.

For example, as shown in FIG. 1, provided that the gate line a and the gate line b are divided into a gate line group, and that the gate line c and the gate line d are divided into a gate line group, wherein a first signal value is applied to the gate line a, a second signal value is applied to the gate line b, a second signal value is applied to the gate line c, and a first signal value is applied to the gate line d; the first signal value is greater than the second signal value, and the first signal value applied to the gate line a is unequal to the first signal value applied to the gate line d, and the second signal value applied to the gate line c is unequal to the second signal value applied to the gate line b; the difference between the first signal value applied to the gate line a and the first signal value applied to the gate line d is relatively small, and since the first signal value is greater than the second signal value, the gate line a is displayed brighter than the gate line b, that is, the gate line b is displayed darker, and the gate line d is displayed brighter than the gate line c, that is, the gate line c is displayed darker.

In an example, a number of the Integrated Circuits in the apparatus for controlling the signal values on the gate lines in the valid display area and in the gate driving circuit provided in the embodiments of the present disclosure may be set according to actual requirements.

In an example, the manner in which the gate lines led from the Integrated Circuit are laid out is not limited to the manner shown in FIG. 1, and may be varied according to the actual requirement, for example, all of the gate lines led from the Integrated Circuit are located on one side of the Integrated Circuit.

In an example, a display apparatus provided in an embodiment of the present disclosure comprises the gate driving circuit and/or the apparatus for controlling the signal values on the gate lines in the valid display area as described above.

In an example, the display apparatus integrating the gate driving circuit and/or the apparatus for controlling the signal values on the gate lines in the valid display area as provided in the embodiment of the present disclosure may be any electronics device with a display function, such as a mobile phone, a tablet computer, a TV, a display of a computer, a notebook computer, or the like.

Although the embodiments of the present disclosure are illustrated as above, they can be altered or modified by those skilled in the art based on the basic principle of the inventive concept explained hereinbefore. Thus, the appended claims are intended to cover the embodiments of the present disclosure as above and all other alternations or modifications fall into the scope of the present disclosure.

Obviously, those skilled in the art can make modifications and variations to the embodiments of the present disclosure without departing from the spirit and scope of the present disclosure. As such, provided that the modifications and variations belong to the scope of the claims and the equivalence thereof, the present disclosure is intended to comprise the modifications and variations.

What is claimed is:

1. A gate driving circuit comprising an integrated circuit driving module and a driving control module;
   wherein the driving control module comprises one or more first strobe units, one or more second strobe units, one or more gate connecting lines in a first layer, one or more gate connecting lines in a second layer, one or more first gate lines and one or more second gate lines;
   wherein the first strobe unit comprises a P-type Metal Oxide Semiconductor (PMOS) transistor and an N-type Metal Oxide Semiconductor (NMOS) transistor, a first control signal is applied to gates of the PMOS transistor and the NMOS transistor, and a gate connecting line in the first layer is connected to a drain of the NMOS transistor and a source of the PMOS transistor in the first strobe unit, the source of the NMOS transistor is directly connected to one end of one of the one or more first gate lines, the drain of the PMOS transistor is directly connected to one end of one of the one or more second gate lines; the second strobe unit comprises a PMOS transistor and a NMOS transistor, wherein a second control signal is applied to gates of the PMOS transistor and the NMOS transistor, a gate connecting line in the second layer is connected to a drain of the NMOS transistor and a source of the PMOS transistor in the second strobe unit, the source of the NMOS transistor is directly connected to the other end of one of the one or more first gate lines, the drain of the PMOS transistor is directly connected to the other end of one of the one or more second gate lines;
   the integrated circuit driving module generates gate driving signals and transmits the gate driving signals to the driving control module;
   wherein the gate connecting line in the first layer and the gate connecting line in the second layer are located in different layers of a Fan-out area on a display substrate, for connecting the gate driving signal and the gate line; the first gate line and the second gate line are two adjacent gate lines located in each gate line group in a valid display area, the number of the gate connecting line in the first layer, the number of the gate connecting line in the second layer and the number of the gate lines are the same.

2. The gate driving circuit of claim 1, wherein the first gate line is connected to the source of the NMOS transistor in the first strobe unit and the source of the NMOS transistor in the second strobe unit, respectively, and the second gate line is connected to the drain of the PMOS transistor in the first strobe unit and the drain of the PMOS transistor in the second strobe unit, respectively;
   for a first frame in any two adjacent frames of image, the driving control module connects the gate connecting line in the first layer to the first gate line by applying the first control signal to gates of the PMOS transistor and NMOS transistor in the first strobe unit, and applies a first signal value to the first gate line via the gate connecting line in the first layer, and connects the gate connecting line in the second layer to the second gate line by applying the second control signal to gates of the PMOS transistor and NMOS transistor in the second strobe unit, and applies a second signal value to the second gate line via the gate connecting line in the second layer; and for a second frame in the two adjacent frames of image, the driving control module connects the gate connecting line in the first layer to the second gate line by applying the second control signal to the gates of the PMOS transistor and NMOS transistor in the first strobe unit, and applies the first signal value to the second gate line via the gate connecting line in the first layer, and connects the gate connecting line in the second layer to the first gate line by applying the first control signal to the gates of the PMOS transistor and NMOS transistor in the second strobe unit, and applies the second signal value to the first gate line via the gate connecting line in the second layer.

3. The gate driving circuit of claim 1, wherein the first gate line is connected to the source of the NMOS transistor in the first strobe unit and the drain of the PMOS transistor in the second strobe unit, respectively, and the second gate line is connected to the drain of the PMOS transistor in the first strobe unit and the source of the NMOS transistor in the second strobe unit, respectively;
   for a first frame in any two adjacent frames of image, the driving control module further connects the gate connecting line in the first layer to the first gate line by applying the first control signal to gates of the PMOS transistor and the NMOS transistor in the first strobe unit, and applies a first signal value to the first gate line via the gate connecting line in the first layer, and connects the gate connecting line in the second layer to the second gate line by applying the first control signal to gates of the PMOS transistor and NMOS transistor in the second strobe unit, and applies a second signal value to the second gate line via the gate connecting line in the second layer; and for a second frame in the o adjacent frames of image, the driving control module connects the gate connecting line in the first layer to the second gate line by applying the second control signal to the gates of the PMOS transistor and NMOS transistor in the first strobe unit, and applies the first signal value to the second gate line via the gate connecting line in the first layer, and connects the gate connecting line in the second layer to the first gate line by applying the second control signal to the gates of the PMOS transistor and NMOS transistor in the second strobe unit, and applies the second signal value to the first gate line via the gate connecting line in the second layer.

4. A display apparatus comprising a gate driving circuit, wherein the gate driving circuit comprises an integrated circuit driving module and a driving control module;
   wherein the driving control module comprises one or more first strobe units, one or more second strobe units, one or more gate connecting lines in a first layer, one or more gate connecting lines in a second layer, one or more first gate lines and one or more second gate lines; wherein the first strobe unit comprises a P-type Metal Oxide Semiconductor (PMOS) transistor and an N-type Metal Oxide Semiconductor (NMOS) transistor, a first control signal is applied to gates of the PMOS transistor and the NMOS transistor, and a gate connecting line in the first layer is connected to a drain of the NMOS transistor and a source of the PMOS transistor in the first strobe unit, the source of the NMOS transistor is directly connected to one end of one of the one or more first gate lines, the drain of the PMOS transistor is directly connected to one end of one of the one or more second gate lines; the second strobe unit comprises a PMOS transistor and a NMOS transistor, wherein a second control signal is applied to gates of the PMOS transistor and the NMOS transistor, a gate connecting line in the second layer is connected to a drain of the NMOS transistor and a source of the PMOS transistor in the second strobe unit, the source of the NMOS transistor is directly connected to the other end of one of the one or more first gate lines, the drain of the PMOS transistor is directly connected to the other end of one of the one or more second gate lines;

the integrated circuit driving module generates gate driving signals and transmits the gate driving signals to the driving control module;

wherein the gate connecting line in the first layer and the gate connecting line in the second layer are located in different layers of a Fan-out area on a display substrate, for connecting the gate driving signal and the gate line; the first gate line and the second gate line are two adjacent gate lines located in each gate line group in a valid display area, the number of the gate connecting line in the first layer, the number of the gate connecting line in the second layer and the number of the gate lines are the same.

5. The display apparatus of claim 4, wherein the first gate line is connected to the source of the NMOS transistor in the first strobe unit and the source of the NMOS transistor in the second strobe unit, respectively, and the second gate line is connected to the drain of the PMOS transistor in the first strobe unit and the drain of the PMOS transistor in the second strobe unit, respectively;

for a first frame in any two adjacent frames of image, the driving control module connects the gate connecting line in the first layer to the first gate line by applying the first control signal to gates of the PMOS transistor and NMOS transistor in the first strobe unit, and applies a first signal value to the first gate line via the gate connecting line in the first layer, and connects the gate connecting line in the second layer to the second gate line by applying the second control signal to gates of the PMOS transistor and NMOS transistor in the second strobe unit, and applies a second signal value to the second gate line via the gate connecting line in the second layer; and for a second frame in the two adjacent frames of image, the driving control module connects the gate connecting line in the first layer to the second gate line by applying the second control signal to the gates of the PMOS transistor and NMOS transistor in the first strobe unit, and applies the first signal value to the second gate line via the gate connecting line in the first layer, and connects the gate connecting line in the second layer to the first gate line by applying the first control signal to the gates of the PMOS transistor and NMOS transistor in the second strobe unit, and applies the second signal value to the first gate line via the gate connecting line in the second layer.

6. The display apparatus of claim 4, wherein the first gate line is connected to the source of the NMOS transistor in the first strobe unit and the drain of the PMOS transistor in the second strobe unit, respectively, and the second gate line is connected to the drain of the PMOS transistor in the first strobe unit and the source of the NMOS transistor in the second strobe unit, respectively;

for a first frame in any two adjacent frames of image, the driving control module further connects the gate connecting line in the first layer to the first gate line by applying the first control signal to gates of the PMOS transistor and the NMOS transistor in the first strobe unit, and applies a first signal value to the first gate line via the gate connecting line in the first layer, and connects the gate connecting line in the second layer to the second gate line by applying the first control signal to gates of the PMOS transistor and NMOS transistor in the second strobe unit, and applies a second signal value to the second gate line via the gate connecting line in the second layer; and for a second frame in the two adjacent frames of image, the driving control module connects the gate connecting line in the first layer to the second gate line by applying the second control signal to the gates of the PMOS transistor and NMOS transistor in the first strobe unit, and applies the first signal value to the second gate line via the gate connecting line in the first layer, and connects the gate connecting line in the second layer to the first gate line by applying the second control signal to the gates of the PMOS transistor and NMOS transistor in the second strobe unit, and applies the second signal value to the first gate line via the gate connecting line in the second layer.

* * * * *